United States Patent
Nadehara

(10) Patent No.: US 8,024,614 B2
(45) Date of Patent: Sep. 20, 2011

(54) DEBUGGER AND DEBUGGING METHOD FOR DEBUGGING A SYSTEM-ON-CHIP DEVICE INCLUDING A MICROPROCESSOR CORE

(75) Inventor: Kouhei Nadehara, Tokyo (JP)

(73) Assignee: NEC Corporation, Tokyo (JP)

( * ) Notice: Subject to any disclaimer, the term of this patent is extended or adjusted under 35 U.S.C. 154(b) by 162 days.

(21) Appl. No.: 12/310,129

(22) PCT Filed: Jul. 4, 2007

(86) PCT No.: PCT/JP2007/063370
§ 371 (c)(1),
(2), (4) Date: Feb. 12, 2009

(87) PCT Pub. No.: WO2008/020513
PCT Pub. Date: Feb. 21, 2008

(65) Prior Publication Data
US 2009/0249122 A1   Oct. 1, 2009

(30) Foreign Application Priority Data
Aug. 14, 2006  (JP) .................. 2006-220958

(51) Int. Cl.
*G06F 11/00* (2006.01)
(52) U.S. Cl. .............. 714/34; 714/30; 714/733

(58) Field of Classification Search ............ 714/28, 714/30, 31, 34, 39; 703/28
See application file for complete search history.

(56) References Cited

U.S. PATENT DOCUMENTS

| | | | |
|---|---|---|---|
| 6,223,305 B1 * | 4/2001 | Simmons et al. | 714/34 |
| 6,389,557 B1 * | 5/2002 | Yu et al. | 714/34 |
| 6,550,022 B1 * | 4/2003 | Faver | 714/34 |
| 6,754,763 B2 * | 6/2004 | Lin | 710/317 |
| 6,760,864 B2 * | 7/2004 | Wood et al. | 714/30 |
| 7,533,315 B2 * | 5/2009 | Han et al. | 714/733 |
| 2007/0220391 A1 * | 9/2007 | Han et al. | 714/742 |

* cited by examiner

*Primary Examiner* — Robert Beausoliel, Jr.
*Assistant Examiner* — Elmira Mehrmanesh
(74) *Attorney, Agent, or Firm* — McGinn Intellectual Property Law Group, PLLC

(57) ABSTRACT

A debugger includes: a break detecting circuit which, when the state of a microprocessor core corresponds to a previously set condition, generates a break request signal for requesting a transition of the microprocessor core to a debug state; a trigger detecting circuit which, when a predetermined signal of additional hardware corresponds to a previously set condition, generates a trigger request signal for requesting observation of the predetermined signal; and, an execution control circuit which, when the trigger request signal has been transmitted, outputs a trigger signal for observing the predetermined signal by means of a logic analyzer and outputs a break signal for causing the microprocessor core to transition to the debug state.

6 Claims, 6 Drawing Sheets

ICE break from a hardware mode event

Trigger for the logic analyzer
from a software mode event

Trigger for the logic analyzer from a software mode event

Transition to the break state from user instruction

DEBUGGER AND DEBUGGING METHOD FOR DEBUGGING A SYSTEM-ON-CHIP DEVICE INCLUDING A MICROPROCESSOR CORE

CROSS-REFERENCES

This application is based upon and claims the benefit of priority from Japanese patent application No. 2006-220958, filed on Aug. 14, 2006, the disclosure of which is incorporated herein in its entirety by reference. This application is also based upon and claims the benefit of priority from Patent Cooperation Treaty (PCT) patent application No. PCT/JP2007/063370, filed on Jul. 4, 2007.

TECHNICAL FIELD

The present invention relates to a debugger and a debugging method for debugging a SoC (System on Chip) device including a microprocessor-core and additional hardware such as a co-processor or a hardware accelerator, etc. for realizing additional functions.

BACKGROUND ART

Recently, as a result of the progress of semiconductor processing technologies, integration of a large number of transistors on a semiconductor chip has been possible, so that LSI devices called SoC devices can be realized, in which an entire system is packaged within a single chip.

The requirement is not only that SoC devices be capable of high performance but also that these devices be flexible enough to accommodate new specifications and demands. To deal with this, a SoC device usually employs an architecture in which a general-purpose microprocessor core (which will be simply referred to hereinbelow as a processor core) is provided as a base and improved performance is achieved by the addition of a co-processor and a hardware-accelerator (which will be simply referred to hereinbelow as an accelerator) and by the use of a multi-core configuration while flexibility is realized by controlling the co-processor and accelerator based on the software (user programs) stored in the processor core.

For example, in non-patent document 1 (Ricardo E. Gonzalez, "Xtensa: A Configurable and Extensible Processor", IEEE MICRO Magazine, Volume 20, Issue 2, March-April 2000, pp. 60~70.), non-patent document 2 (Steve Leibson/James Kim, "Configurable Processors: A New Era in Chip Design," IEEE Computer Magazine, Volume 38, Issue 7, July 2005, pp. 51-59) and patent document 1 (Japanese Patent Application Laid-open No. 2004-288203), processor cores as SoC devices that permit functional extension by adding co-processors and accelerators are exemplified.

When such a SoC device is debugged, it is necessary to simultaneously debug both the software (user programs) for operating the processor core and the additional hardware such as co-processors, accelerators and the like for realizing additional functions. ICEs (In-Circuit Emulators) are well known as tools that are used to debug software (user programs). Logic analyzers are well known as tolls that are used to debug hardware.

An ICE provides a debug environment in which the processor core provided on a SoC device is abstracted in the programming model level. More specifically, this provides functions such as reading/writing of the internal register provided for the processor core, reading/writing of the system memory, execution control (start of execution from a designated address and stop at one of break points) and the like, as described in non-patent document 3 (Shigetoshi Yamamoto/Kazutoshi Arimatsu, "An installed device and debug environment", CQ Publishing Co., Ltd., Interface, March 2002, pp. 49-53). It should be noted that in the ICE, hardware-level information is hidden from the user.

A typical ICE configuration will be described using FIG. 1.

FIG. 1 is a block diagram showing a configuration of a conventional ICE used as a debugger of user programs.

As shown in FIG. 1, ICE unit 6 includes break detecting circuit 7 to realize execution control of processor core 2. Break detecting circuit 7 monitors the state of processor core 2 (which will be simply referred to hereinbelow as the processor state), such as the value on the program counter of processor core 2, instruction words being executed, and the like. When the processor state coincides with the previously designated break condition, specifically, when the value on the program counter reaches the previously set value or when a well-known trap instruction is executed, the circuit outputs a break signal (hereinafter, occurrence of a break signal will be called "a software mode event") so as to cause processor core 2 to transition from the execution state of a user program to the debuggable state (debug state) of the user program. Here, the trap instruction may also be called, software interrupts, debug instruction, break instruction or the like.

ICE UI (User Interface) 8 sets up the break condition on which break detecting circuit 7 is caused to output a break signal, in accordance with operations from the user. ICE UI 8 also implements reading and writing of the internal register of processor core 2 being debugged, in accordance with operations from the user. At this time, ICE unit 6 executes the process, based on the software for reading from, and writing to, the internal register of processor core 2 being transitioned to the debug state, or the system memory, to thereby assist the user to debug the user program.

For example, on pp. 13-40 in non-patent document 4 ("ARM1156T2F-S Technical Reference Manual, Revision: r0p0", ARM Limited, 2005, internet <URL: http:/www.arm-.com/pdfs/DD10290C_arm1156t2fs_r0p9_trm.pdf>), there is disclosed a processor of ARM Limited, Britain, known as an embedded processor core, which realizes the function of an ICE unit by making a transition to software controller, called "Monitor target", when an interrupt signal called "Debug exception" occurs.

A logic analyzer, as described in, for example, non-patent document 5 (Nobutaka Arai "the operational principle of a logic analyzer", CQ Publishing Co., Ltd., Transistor Technology, July 2003, pp. 128-134), is a device for monitoring and recording the temporal change (waveform) of a predetermined signal (observed signal) designated by the user. A typical logic analyzer configuration will be described using FIG. 2.

FIG. 2 is a block diagram showing a configuration of a logic analyzer used as a conventional hardware debugger.

As shown in FIG. 2, logic analyzer unit 20 includes trigger detecting circuit 12, trace memory 13 and logic analyzer UI 14.

Trigger detecting circuit 12 compares the user-designated trigger condition with a predetermined input signal, and generates a trigger signal when these coincide with each other (hereinafter, occurrence of this trigger signal will be called "a hardware mode event").

Trace memory 13 stores the observation signals before and after the occurrence of a trigger signal as it is, out of the observation signals output from additional hardware 3. However, the observation signals to be stored into trace memory 13 may be optionally subjected to the least necessary processes such as being shaped in waveform, being synchronized with a predetermined sampling clock and the like.

Logic analyzer UI (User Interface) 14 sets up the trigger condition on which trigger detecting circuit 12 is caused to generate a trigger signal, in accordance with operations from the user. Logic analyzer UI 14 also displays signals that are stored in trace memory 13.

FIG. 3 shows how the software (user programs) operating on processor core 2 integrated in SoC device 1 and additional hardware 3 are debugged using an existing ICE and logic analyzer. FIG. 3 shows the manner in which the processor state is read out from processor core 2 integrated in SoC device 1 by ICE unit 6 and shows the situation in which the signals to be observed (observed signals) are monitored from additional hardware 3 such as co-processor 4, accelerator 5, etc., by logic analyzer unit 20.

Since in this simultaneous debugging using ICE unit 6 and logic analyzer unit 20, ICE unit 6 and logic analyzer unit 20 are independent devices, the lack of sufficient cooperation between these devices leads to a problem in which it is difficult to achieve efficient debugging based on the cooperation of ICE unit 6 and logic analyzer unit 20.

As an example using cooperation of ICE unit 6 and logic analyzer unit 20, technology described in non-patent document 6 ("Debug by cooperation of a logic analyzer and an ICE)", CQ Publishing Co., Ltd., Interface, October, 2000, p. 108) is well known. Non-patent document 6 describes an example in which a break signal for the co-processor, which is output from the ICE, is used as a trigger signal for the logic analyzer, and in which the times corresponding to the execution history ("History window of WATCHPOINT" in non-patent document 6) stored in the ICE are displayed with the signal waveform of the observation signals, on the logic analyzer.

As stated above, since, in the conventional debugger, the ICE used for debugging user programs and the logic analyzer used for debugging hardware are independent devices, the lack of sufficient cooperation between these devices leads to a problem in which it is difficult to achieve efficient debugging based on the cooperation of these devices.

Although the above cited non-patent document 6 describes an example in which a software mode event is used as a trigger signal for the logic analyzer, no method is shown for using a hardware mode event as a break signal for the ICE unit. Therefore, a problem occurs in which, even if it is desirable to stop operation of the entire system by causing the processor core to transition to the debug state when an internal signal from the additional hardware or when an external signal has reached a particular state, it is impossible to execute this activity.

In this way, since the existing ICE and logic analyzer are not sufficient enough to cooperate with each other, a problem occurs in which it is difficult to debug a SoC device that operates based on the cooperation of hardware and software (user programs).

SUMMARY

It is therefore an object of the exemplary aspect of the invention to provide a debugger and debugging method capable of efficiently debugging a SoC device in which a microprocessor-core and additional hardware for realizing additional functions are integrated together.

In order to attain the above object, in an exemplary aspect of the invention, when the state of the microprocessor core corresponds to a previously set condition, a break request signal for requesting a transition of the microprocessor core to a debug state is generated, and when a predetermined signal of the additional hardware corresponds to a previously set condition, a trigger request signal for requesting observation of the predetermined signal is generated. Then, when the trigger request signal is transmitted, a trigger signal for observing the predetermined signal by means of a logic analyzer is output, and a break signal for causing the microprocessor core to transition to the debug state is output, to the system-on-chip device.

Alternatively, when the break request signal is transmitted, a trigger signal for observing the predetermined signal by means of a logic analyzer is output to the system-on-chip device to suspend supply of a clock to the microprocessor core and to the additional hardware, thereby causing the microprocessor core and the additional hardware to operate normally.

In the above configuration and method, when a trigger request signal is transmitted, a trigger signal is output, and a break signal for causing the microprocessor core to transition to the debug state is output to the system-on-chip device, whereby it is possible to cause the processor core to transition to the debug state when a hardware mode event has occurred.

In the above configuration and method, when a break request signal is transmitted, a trigger signal is output to the system-on-chip device so as to suspend supply of a clock to the microprocessor core and the additional hardware, whereby it is possible to execute control of the system-on-chip device in clock units.

Accordingly, it is possible to realize debugging by integrated operation of an ICE and a logic analyzer, it is hence possible to efficiently debug a system-on-chip device with a processor core and additional hardware that are integrated together in order to realize an additional function.

EXEMPLARY EMBODIMENT

Next, the present invention will be described with reference to the drawings.

The First Exemplary Embodiment

Figure 4:
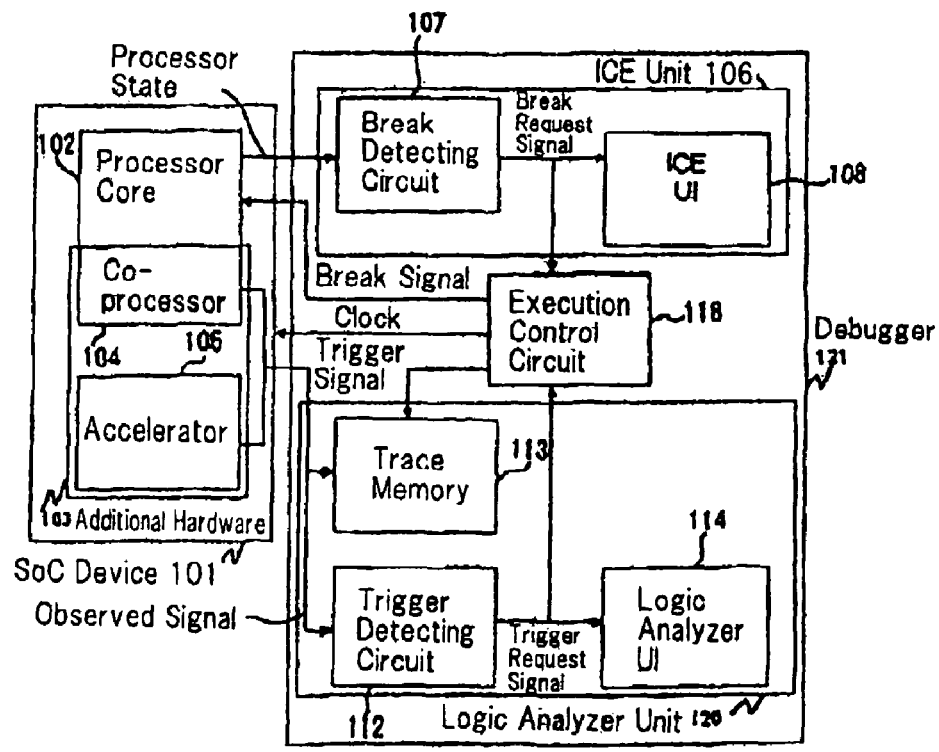
FIG. 4 is a block diagram showing a configurational example of a debugger of the exemplary aspect of the invention.

FIG. 4 is a block diagram showing one configurational example of a debugger of the exemplary aspect of the invention.

Debugger 121 of the exemplary aspect of the invention is a device for debugging SoC device 101 on which processor core 102 and additional hardware 103 are integrated together. Additional hardware 103 is a general term for hardware circuits such as co-processor 104, accelerator 105 and the like that operate in harmony with processor core 102. Additional hardware 103 does not need to be integrated on the same semiconductor chip of processor core 102 as long as it operates in harmony with processor core 102. Further, when processor core 102 operates in harmony with another device mounted on the same printed circuit board or another device in the same system, these devices may be included as the debugging targets of debugger 121.

As shown in FIG. 4, debugger 121 of the exemplary aspect of the invention includes ICE unit 106, logic analyzer unit 120 and execution control circuit 118

Connected to processor core 102 provided for SoC device 101 is ICE unit 106 of debugger 121 whereas logic analyzer unit 120 is connected to additional hardware 103.

ICE unit 106 includes break detecting circuit 107 and ICE UI (ICE user interface) 108. Also, logic analyzer unit 110 includes trigger detecting circuit 112, trace memory 113 and logic analyzer UI 114.

Break detecting circuit 107 monitors the processor state of processor core 102, and determines the occurrence of a software mode event when the processor state coincides with the previously set condition and generates a break request signal for requesting processor core 102 to transition to the debug state. Examples of processor state 109 used as the condition for generating a break request signal include the value on the program counter, instruction words to be executed, address and data value to be loaded or stored and the like. However, other than these, signals that the user refers to as a programming model of processor core 102, signals that are to be generated for the internal process (signals that are hidden from the user may be permitted) and the like may be used as the processor state that is to be used as the condition for generating a break request signal. Here, it is assumed that break detecting circuit 107 can monitor an arbitrary number of break conditions. When there is a plurality of break conditions, the break request signal generated by break detecting circuit 107 may be output from a single signal line by integrating the plural break conditions, or a plurality of break request signals may be output using signal lines provided for individual break conditions. Further, break detecting circuit 107 may output a break request signal having a plurality of encoded break conditions.

ICE UI (User Interface) 108 sets up a break condition on which break detecting circuit 107 is caused to output a break request signal in accordance with operations from the user. Also, ICE UI 108, in accordance with operations from the user, executes reading and writing of the internal register of processor core 2 which is being debugged.

The observed signals from additional hardware 103 are supplied to trigger detecting circuit 112 and trace memory 113.

Trigger detecting circuit 112 monitors at least one observed signal connected to additional hardware 103, and decides occurrence of a hardware level when the observed signal coincides with the previously set condition and generates a trigger request signal to request observation of the observed signal.

Figure 2:
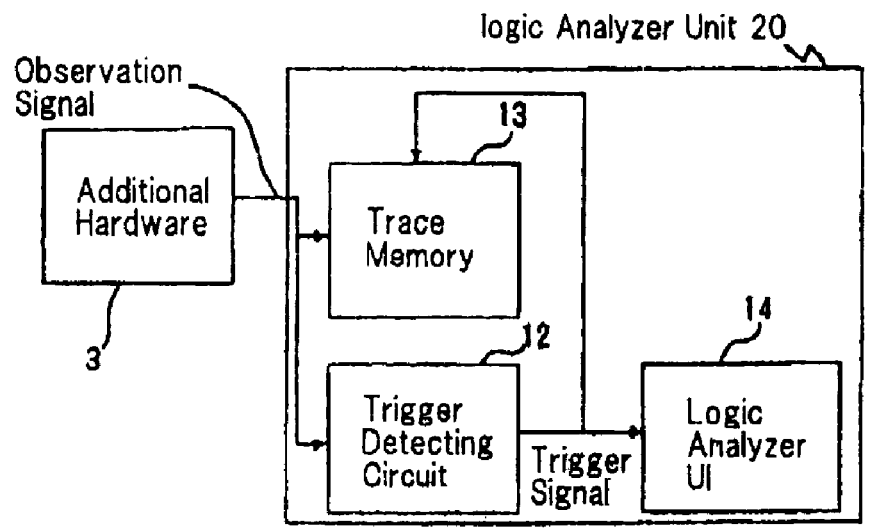
FIG. 2 is a block diagram showing a configuration of a logic analyzer used as a conventional hardware debugger.
Figure 3:
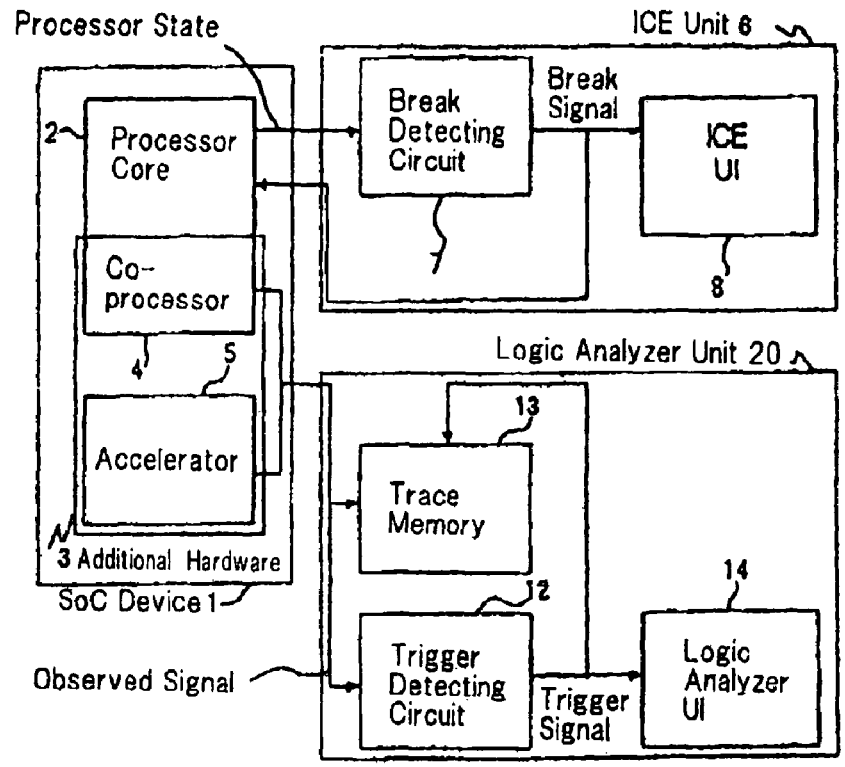
FIG. 3 is a block diagram showing how a SoC device is debugged using the ICE unit shown in FIG. 1 and the logic analyzer unit shown in FIG. 2.

Similarly to the conventional logic analyzer unit 120 shown in FIG. 2, the observation signals before and after the occurrence of a trigger request signal are stored almost as they are into trace memory 113.

Logic analyzer UI (User Interface) 114 sets up a trigger condition according to which trigger detecting circuit 112 is caused to output a trigger request signal in accordance with operations from the user. Also, logic analyzer UI 114 displays the signals stored in trace memory 113.

Here, all the observed signals do not need to be transmitted from SoC device 101 to trigger detecting circuit 112 and trace memory 113, but there may be observed signals that are transmitted to trigger detecting circuit 112 only and there may be observed signals that are transmitted only to trace memory 113.

Execution control circuit 118, based on the break request signal that indicates the occurrence of a software mode event and based on the trigger request signal that indicates the occurrence of a hardware mode event, generates a break signal for causing processor core 102 to transition to the debug state and a trigger signal for observing the observed signals by logic analyzer unit 120. Execution control circuit 118 forms the simplest configuration when it outputs the result of the logical sum of the break request signal and the trigger request signal as the break signal and the trigger signal. In addition, break detecting circuit 107, trigger detecting circuit 112 and execution control circuit 118 may also have the function of masking the break request signal and the trigger request signal in accordance with the breaking condition and the trigger condition.

Next, the debugging method in the present exemplary embodiment will be described using FIGS. 5A and 5B.

Figure 5A:
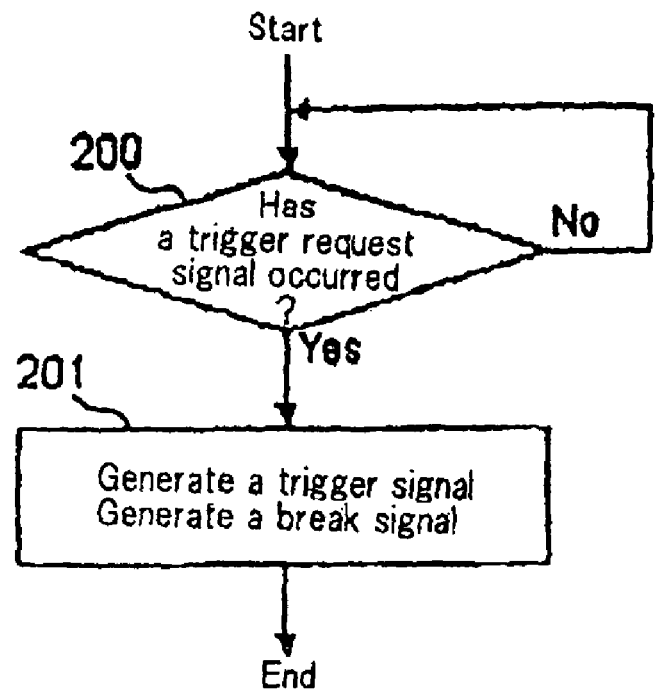
FIG. 5A is a flow chart showing the process of the first exemplary embodiment of a debugging method of the exemplary aspect of the invention.

FIG. 5A is a flow chart showing the process of the first exemplary embodiment of a debugging method of the exemplary aspect of the invention. FIG. 5B is a timing chart showing the process of the first exemplary embodiment of a debugging method of the exemplary aspect of the invention. Here, the flow chart shown in FIG. 5A shows the processing sequence of execution circuit 118 in the first exemplary embodiment and FIG. 5B shows an example of the timing chart of input/output signals of execution control circuit 118.

As shown in FIG. 5A, execution control circuit 118 monitors whether or not a trigger request signal from trigger detecting circuit 112 has been transmitted (Step 200) and generates a trigger signal and a break signal when a trigger request signal has been transmitted (Step 201).

Figure 5B:
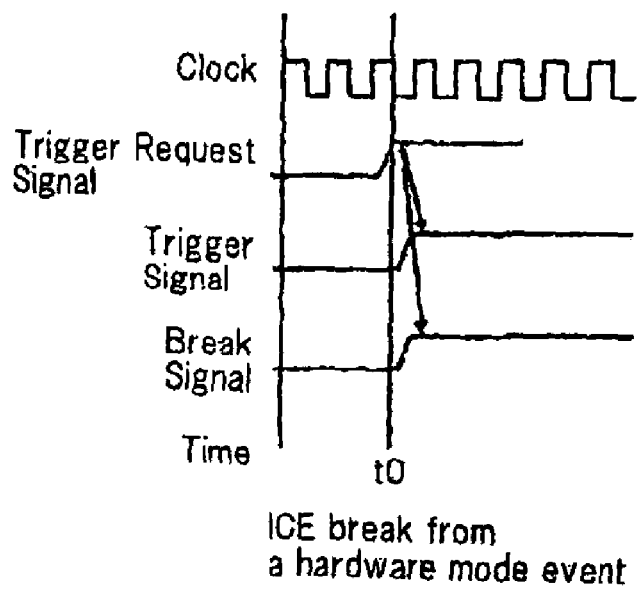
FIG. 5B is a timing chart showing the process of the first exemplary embodiment of a debugging method of the exemplary aspect of the invention.

As shown in FIG. 5B, when a trigger request signal is transmitted at time t0 in trigger detecting circuit 112, execution control circuit 118 transmits a trigger signal to trace memory 113 and a break signal to processor core 102, at the same time.

Though a case where execution control circuit 118 generates a break signal for suspending the operation of processor core 102 and a trigger signal for storing the observed signals, when a trigger request signal has been transmitted, is exemplified in FIGS. 5A and 5B, execution control circuit 118 similarly also generates a break signal and a trigger signal when a break request signal has been transmitted.

In the debugging method of the first exemplary embodiment, trigger detecting circuit 112 monitors the internal signals of additional hardware 103 and external signals (observed signals), and when these observed signals correspond to the predetermined conditions, execution control circuit 118 also generates a break signal and outputs it to processor core 102.

At this time, processor core 102 of SoC device 101 stops its operation based on the user program in accordance with the break signal and transitions to the debug state, so that the user can read and write the content of the program counter, the general-purpose register or the memory provided for processor core 102 by means of ICE unit 106.

Accordingly, in the present exemplary embodiment, either when a software mode event has occurred in ICE unit 106 or when a hardware mode event has occurred in logic analyzer unit 120, it is possible to cause ICE unit 106 to transition to the debug state and it is possible for logic analyzer unit 120 to observe the observed signals. That is, it is possible to break the operation of processor core 102 when a hardware mode event has occurred, it is hence possible to realize debugging based on the integrated operation of ICE unit 106 and logic analyzer unit 120. As a result, it is possible to efficiently debug a SoC device in which processor core 102 and additional hardware 103 have been integrated together.

It should be noted that in the debugger of the first exemplary embodiment, execution control circuit 118 constantly supplies a clock to SoC device 101 whether or not a break request signal or a trigger request signal is present, as shown in FIG. 5B.

The Second Exemplary Embodiment

SoC device 101 is, in principle, constructed of synchronous circuits that operate in synchronization with a clock, with a view to design simplicity, and every circuit block such as processor core 102, additional hardware 103 for realizing additional functions and the like, or the entire circuit of SoC device 101, operates in synchronism with a common clock.

In debugging additional hardware 103, there is a case where it is desirable that the observed signals output from SoC device 101 be recorded and examined in clock units by logic analyzer unit 120, and it is desirable that execution control of SoC device 101 be performed in clock units (more finely than the execution control based on the break signal that is carried out in instruction units by ICE unit 106) when an event has occurred. Such execution control in clock units can be realized by adding the function of suspending the supply of clocks to execution control circuit 118, shown in the first exemplary embodiment, when an event occurs.

The debugger of the second exemplary embodiment is different from the debugger of the first exemplary embodiment in the configuration and operation of execution control circuit 118. Since other configurations and operations are the same as those in the first exemplary embodiment, their description will be omitted.

Figure 6A:
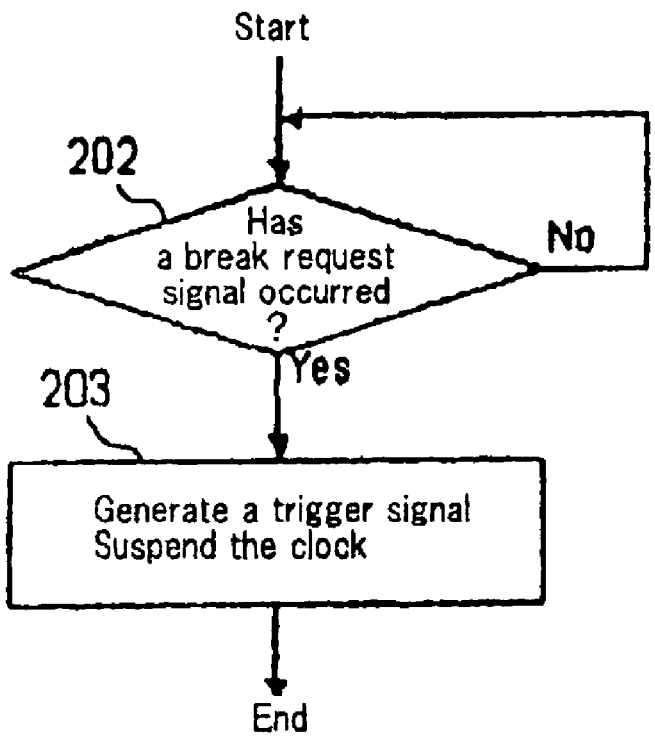
FIG. 6A is a flow chart showing the process of the second exemplary embodiment of a debugging method of the exemplary aspect of the invention.
Figure 6B:
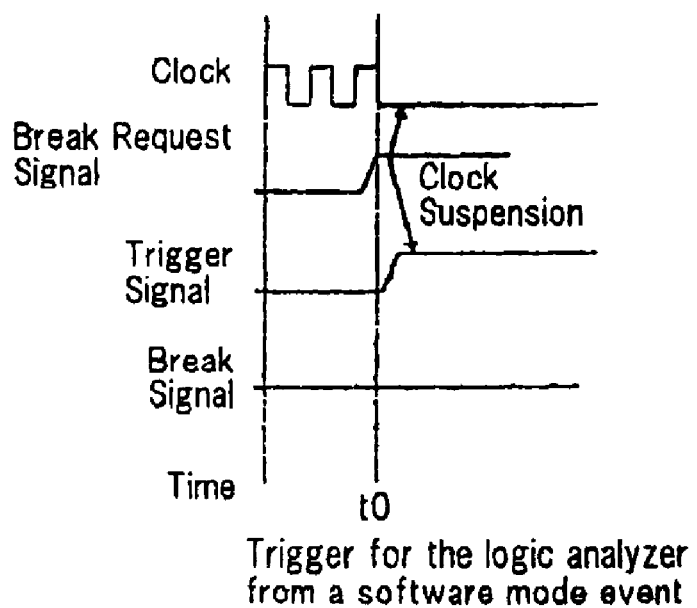
FIG. 6B is a timing chart showing the process of the second exemplary embodiment of a debugging method of the exemplary aspect of the invention.

FIG. 6A is a flow chart showing the process of the second exemplary embodiment of a debugging method according to an exemplary aspect of the invention. FIG. 6B is a timing chart showing the process of the second exemplary embodiment of a debugging method according to an exemplary aspect of the invention. Here, the flow chart shown in FIG. 6A shows the processing sequence of execution control circuit 118 in the second exemplary embodiment and FIG. 6B shows an example of the timing chart of input/output signals of execution control circuit 118.

As shown in FIG. 6A, execution control circuit 118 of the second exemplary embodiment monitors whether or not a break request signal from break detecting circuit 107 has been transmitted (Step 202) and generates a trigger signal to enable logic analyzer unit 120 to monitor the observed signals and suspends supply of a clock to SoC device 101 when a break request signal has been transmitted.

As shown in FIG. 6B, when execution control circuit 118 of the second exemplary embodiment receives a break request signal from break detecting circuit 107 at time t0, it outputs a trigger signal so as to enable logic analyzer unit 120 to monitor the observed signals and stop the supply of a clock to SoC device 101. Execution control circuit 118 restarts the supply of a clock to SoC device 101 in accordance with operation from the user, for example.

According to the present exemplary embodiment, in addition to the effect obtained in the first exemplary embodiment, execution control of SoC device 101 can be controlled in clock units, so that it is possible to debug additional hardware 103 provided for SoC device 101 in a more precise manner.

The Third Exemplary Embodiment

In the debugger of the second exemplary embodiment, the function of logic analyzer unit 120 can be used but the function of ICE unit 106 cannot when the supply of a clock to SoC device 101 is suspended. That is, while the signals extracted as the observed signals from SoC device 101 can be monitored, the signals that are not included as the observed signals, e.g., the program counter value, information stored in the general-purpose register and the like, all of which can be usually observed in the ICE unit, cannot be monitored if they are not included as the observed signals. In general, the function of ICE unit 106 is implemented by the operation of the software that is installed in processor core 102 and actuated in accordance with the predetermined interrupt signal. Accordingly, if operation of processor core 102 is stopped by suspending the supply of a clock, the function of ICE unit 106 can no longer be used.

Even though the supply of a clock to SoC device 101 is suspended, it is possible to rewrite the content of the internal register of processor core 102 if another clock, that is different from the common clock, is used and if a circuit for storing data into each bit of the register that is to be written is added, as described in Japanese Patent Application Laid-open No. 2005-181061. However, adding such a circuit increases the load on the circuit design of SoC device 101 and induces the lowering of operating frequency accompanied by the addition of the circuit, hence it is not possible to adopt this method easily.

Further, since processor core 102 and additional hardware 103 are usually operated in a multi-stage pipeline mode, derivative signals that depend on a certain signal exist for every pipeline stage. Accordingly, when an arbitrary internal register of SoC device 101 is rewritten, it is necessary to rewrite all the signals that are derived from the value in that internal register. However, it is difficult to rewrite the value of the internal register and all the derivative signals coherently, through the manual input of the user.

In the third exemplary embodiment, when, under state in which the supply of a clock has been suspended, a break signal request occurs in accordance with operations from the user, execution control circuit 118 restarts the supply of a clock to SoC device 101.

That is, the debugger of the third exemplary embodiment is different from the debugger of the second exemplary embodiment in the configuration and operation of execution control circuit 118. Since other configurations and operations are the same as those in the first and second exemplary embodiments, their description will be omitted.

The operation of execution control circuit 118 of the third exemplary embodiment will be described using FIGS. 7A and 7B.

Figure 7A:
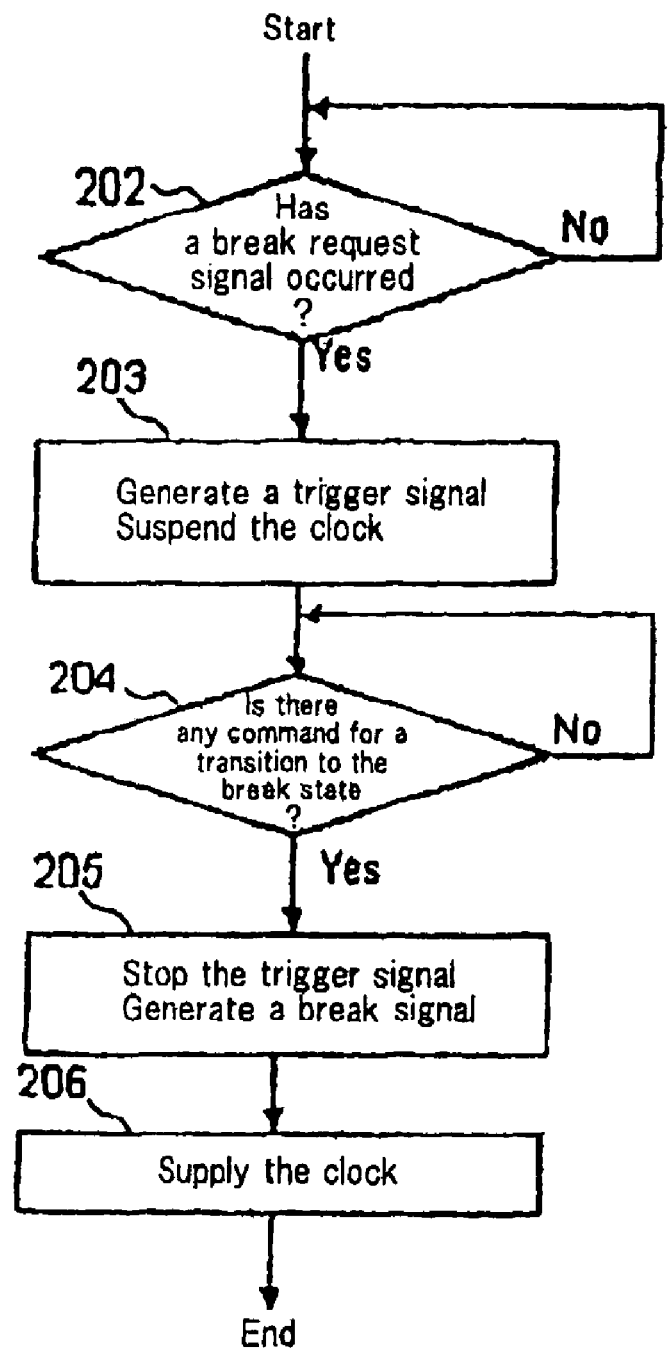
FIG. 7A is a flow chart showing the process of the third exemplary embodiment of a debugging method of the exemplary aspect of the invention.

FIG. 7A is a flow chart showing the process of the third exemplary embodiment of a debugging method according to an exemplary aspect of the invention. FIG. 7B is a timing chart showing the process of the third exemplary embodiment of a debugging method according to an exemplary aspect of the invention. Here, the flow chart shown in FIG. 7A shows the processing sequence of execution circuit 118 in the third exemplary embodiment and FIG. 7B shows an example of the timing chart of input/output signals of execution control circuit 118.

As shown in FIG. 7A, similar to the second exemplary embodiment, execution control circuit 118 of the third exemplary embodiment monitors whether or not a break request signal from break detecting circuit 107 has been transmitted (Step 202) and generates a trigger signal to makes it possible to monitor the observed signals in logic analyzer unit 120 and suspends supply of clock 119 to the SoC device when a break request signal has been transmitted (Step 203).

In this state, it is impossible to monitor the observed signals that have not been extracted from additional hardware 103 similar to the second exemplary embodiment, hence it is impossible to rewrite the internal register of processor core 102 unless an additional circuit disclosed in aforementioned Japanese Patent Application Laid-open No. 2005-181061 is provided.

Execution control circuit 118 of the third exemplary embodiment, if an operation to cause a transition to the debug state is given from the user via ICE UI 108 under state in which the supply of a clock has been suspended (Step 204), stops generation of a trigger signal and outputs a break signal (Step 205) and restarts the supply of a clock to SoC device 101 (Step 206).

Figure 7B:
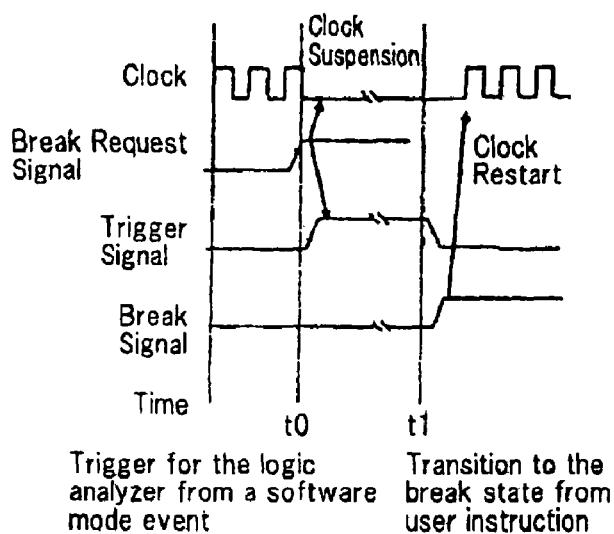
FIG. 7B is a timing chart showing the process of the third exemplary embodiment of a debugging method of the exemplary aspect of the invention.

As shown in FIG. 7B, when receiving a break request signal from break detecting circuit 107 at time t0, the execution control circuit of the third exemplary embodiment generates a trigger signal to stop the supply of a clock to SoC device 101.

When an operation for causing a transition to the debug state from the user via ICE UI 108 is given at time t1 after supply of a clock has been suspended, execution control circuit 118 cancels the trigger signal and outputs a break signal, then restarts the supply of a clock to SoC device 101.

When the operation restarts as a result of supplying a clock, processor core 102 transitions to the debug state since the break signal has already been output. Since the function of ICE unit 106 can be used in this state, the user can check the value on the program counter and the internal register, or can rewrite the internal register, making use of the function of ICE unit 106.

According to the present exemplary embodiment, in addition to the effect shown in the second exemplary embodiment, even when a hardware mode event has occurred, it is possible to use the debugging functions of ICE unit 106 such as the program counter, reading and writing of the general-purpose register and the like without adding any circuit to SoC device 101.

Figure 8:
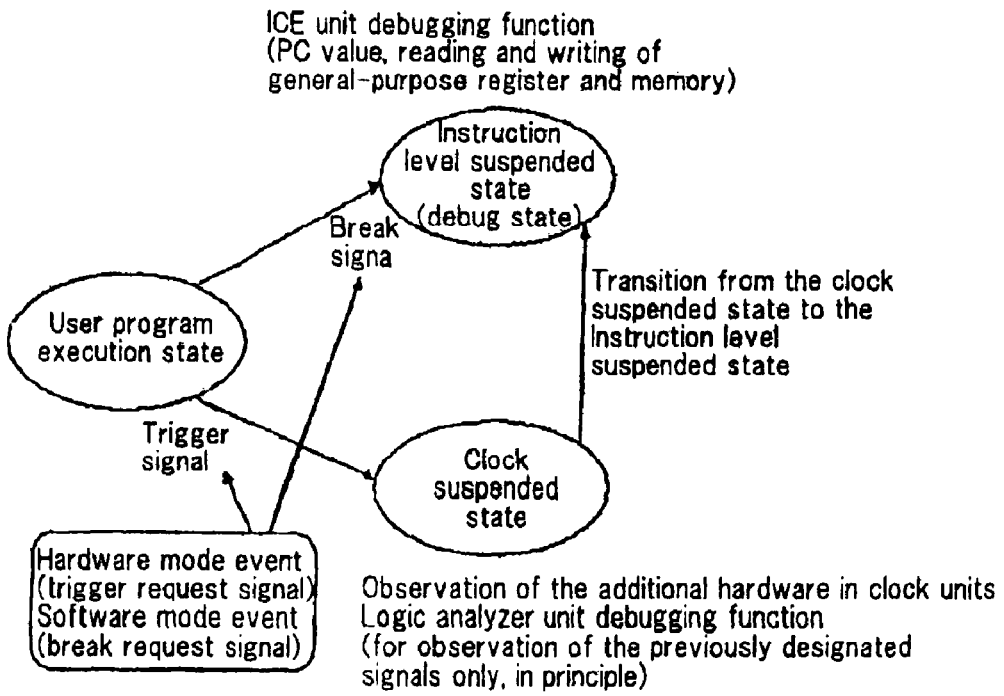
FIG. 8 is a state transition chart showing the operational states of the SoC device shown in FIG. 4.

Since the debuggers of the exemplary aspect of the invention have been described heretofore, when SoC device 101 shown in FIG. 4 is debugged using debugger 121 of the exemplary aspect of the invention, SoC device 101 makes transitions between the three states shown in FIG. 8.

FIG. 8 is a state transition diagram showing operational states of the SoC device shown in FIG. 4.

The first state is "user application execution state" representing the execution state of a normal operation.

The second state is "instruction level suspended state" (debug state) in which, while the operation based on the user program is suspended as a result of the occurrence of a break signal, the operation is executed based on the software for realizing the function of ICE unit 106. In this state, the value on the program counter can be checked or the internal resistor of processor core 102 and the system memory can be read and written, using the function of ICE unit 106.

The third state is "clock suspended state" as a result of the occurrence of a trigger signal.

Figure 1:
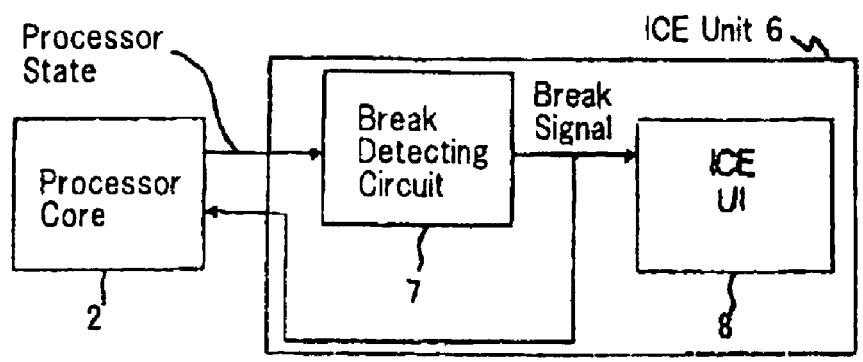
FIG. 1 is a block diagram showing a configuration of a conventional ICE used as a user program debugger.

The debugger of the first exemplary embodiment described above has a configuration in which a break signal can also be generated from a hardware mode event in addition to the conventional configuration (FIG. 1) where a break signal is generated from a software mode event. Use of the debugger of the first exemplary embodiment makes it possible to debug the user programs stored in processor core 102 because SoC device 101 makes a transition to the instruction level suspended state (debug state) in accordance with the occurrence of a hardware mode event.

The debugger of the second exemplary embodiment has a configuration in which a hardware mode event is used not only for the timing of monitoring the observed signals by logic analyzer unit 120 but also used to stop the supply of a clock to the SoC device, whereby SoC device 101 as a whole is made to transition to the suspended state.

The debugger of the third exemplary embodiment has a configuration in which the debugging function by ICE unit 106 which is difficult to achieve in the clock suspended state is realized by enabling transition from the clock suspended state to the instruction level suspended state.

As has been described heretofore in the first to third exemplary embodiments, according to the exemplary aspect of the invention, regardless of a hardware mode event or software mode event, it becomes possible for logic analyzer unit 120 to monitor the observed signals in additional hardware 103 and for logic analyzer unit 120 check the processor state of processor core 102 and read and write the internal register, hence it is possible to provide a debug environment in which the operations of ICE unit 106 and logic analyzer unit 120 are integrated, hence it is possible to markedly improve the development environment of SoC device 101.

Though the above description shows a debugger 121 configuration including break detecting circuit 107, trace memory 113 and trigger detecting circuit 112, these circuits does not need to be provided for debugger 121, but may be provided for SoC device 101.

For example, in the recent SoC device 101, the signal frequency has become higher, hence there occur cases in which the signals have to be observed near additional hardware 103. In such a case, if SoC device 101 is provided with trigger detecting circuit 112 and trace memory 113, it is possible to prevent erroneous storage of the observed signals in trace memory 113 and erroneous output of a trigger signal from trigger detecting circuit 112.

Further, when the function of SoC device 101 is emulated using a FPGA (Field Programmable Gate Array) etc., it is possible to enable the FPGA to have not only the aforementioned break detecting circuit 107, trace memory 113 and trigger detecting circuit 112 but also partial functions of execution control circuit 118, ICE UI 108 and logic analyzer 114.

Though, in the above description, an example of supplying a clock from execution control circuit 118 to SoC device 101 is shown, it is not necessary to supply a clock from execution control circuit 118 to SoC device 101 as long as supply/suspension of the clock to SoC device 101 can be controlled. For example, it is possible to contemplate an architecture in which execution control circuit 118 creates a clock enable signal and SoC device 101 generates a clock thereinside and controls supply/suspension of the clock, based on said enable signal.

Also, though the timing charts shown in FIGS. 5B, 6B and 7B showed examples in which a trigger signal or a break signal is generated or an event such as suspension or restart of supplying a clock or the like occurs when a break request signal or a trigger request signal changes from Low level to High level, and that these events may occur when the signal changes from High level to Low level. Whether the timing at which a trigger signal or a break signal is generated or at which supply of clock is suspended or restarted is indicated by the rising or falling transition of the break request signal or the trigger request signal is not essential but the timing may be optional.

The invention claimed is:

1. A debugger for debugging a system-on-chip device in which a microprocessor core and additional hardware for realizing an additional function are integrated together, the debugger comprising:
    a break detecting circuit which, when a state of said microprocessor core corresponds to a previously set condition, generates a break request signal for requesting a transition of said microprocessor core to a debug state;
    a trigger detecting circuit which, when a predetermined signal of said additional hardware corresponds to a previously set condition, generates a trigger request signal for requesting observation of said predetermined signal; and
    an execution control circuit which, when said break request signal has been transmitted, outputs a trigger signal for observing said predetermined signal by a logic analyzer and which suspends supply of a clock to said microprocessor core and said additional hardware, to cause said microprocessor core and said additional hardware to operate normally,
    wherein, while supply of said clock to said microprocessor core and said additional hardware is being suspended, said execution control circuit, when receiving an external command to transition said microprocessor core to said debug state, stops output of said trigger signal, outputs a break signal for causing said microprocessor core to transition to said debug state and restarts supply of said clock to said microprocessor core and additional hardware,
    wherein either when a software mode event has occurred or when a hardware mode event has occurred in the logic analyzer, the microprocessor core transitions to the debu state and the logic analyzer observes the observed signals where there is a break in operation of the microprocessor core.

2. The debugger according to claim 1, wherein the execution control circuit generates the break signal for suspending a normal operation of the microprocessor core and the trigger signal for storing the observed signals when the trigger request signal has been transmitted.

3. The debugger according to claim 1, wherein the execution control circuit generates the break signal and the trigger signal when the break request signal has been transmitted.

4. A debugging method for debugging a system-on-chip device in which a microprocessor core and additional hardware for realizing an additional function are integrated together, the debugging method comprising:
    generating a break request signal for requesting a transition of said microprocessor core to a debug state when a state of said microprocessor core corresponds to a previously set condition;
    generating a trigger request signal for requesting observation of a predetermined signal when said predetermined signal of said additional hardware corresponds to a previously set condition;
    outputting a trigger signal for observing said predetermined signal by a logic analyzer and suspending supply of a clock to said microprocessor core and to said additional hardware when said break request signal has been transmitted, to cause said microprocessor core and said additional hardware to operate normally; and
    while supply of said clock to said microprocessor core and to said additional hardware is being suspended,
    when receiving a command to transition said microprocessor core to said debug state, stopping output of said trigger signal, outputting a break signal to said system-on-chip device for causing said microprocessor core to transition to said debug state, and restarting supply of said clock to said microprocessor core and to said additional hardware,
    wherein either when a software mode event has occurred or when a hardware mode event has occurred in the logic analyzer, the microprocessor core transitions to the debug state and the logic analyzer observes the observed signals where there is a break in operation of the microprocessor core.

5. The debugging method according to claim 4, wherein the outputting of the break signal for suspending a normal operation of the microprocessor core and the outputting trigger signal for storing the observed signals are both made when the trigger request signal has been transmitted.

6. The debugging method according to claim 4, wherein the outputting the break signal and the outputting the trigger signal are both executed when the break request signal has been transmitted.

* * * * *